(12) United States Patent
Gaugler et al.

(10) Patent No.: US 12,057,608 B2
(45) Date of Patent: Aug. 6, 2024

(54) SEPARATOR PLATE WITH PERIODIC SURFACE STRUCTURES IN THE NANOMETER TO MICROMETER RANGE

(71) Applicant: Reinz-Dichtungs-GmbH, Neu-Ulm (DE)

(72) Inventors: Bernd Gaugler, Ulm (DE); Dieter Grafl, Ulm (DE); Stephan Wenzel, Pfaffenhofen (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 546 days.

(21) Appl. No.: 17/195,506

(22) Filed: Mar. 8, 2021

(65) Prior Publication Data
US 2021/0288336 A1 Sep. 16, 2021

(30) Foreign Application Priority Data

Mar. 10, 2020 (DE) ...................... 10 2020 202 999.7

(51) Int. Cl.
| | |
|---|---|
| *H01M 8/026* | (2016.01) |
| *B23K 26/0622* | (2014.01) |
| *B23K 101/36* | (2006.01) |
| *H01M 8/18* | (2006.01) |

(52) U.S. Cl.
CPC ......... *H01M 8/026* (2013.01); *B23K 26/0624* (2015.10); *H01M 8/188* (2013.01); *B23K 2101/36* (2018.08)

(58) Field of Classification Search
CPC .... H01M 8/026; H01M 8/188; B23K 26/0624
See application file for complete search history.

(56) References Cited

U.S. PATENT DOCUMENTS

| | | | | |
|---|---|---|---|---|
| 2016/0305011 A1* | 10/2016 | Wang | ..................... | H01G 9/055 |
| 2019/0319279 A1* | 10/2019 | Kunz | .................. | H01M 8/1004 |

FOREIGN PATENT DOCUMENTS

WO    2018114819 A1    6/2018

OTHER PUBLICATIONS

Hoehm, S., "Dynamics of creation and mechanisms of formation of periodic surface structures in the nanometre range (LIPSS) by irradiation of solids with femtosecond laser pulses," Mathematics and Natural Sciences Doctoral Thesis, Technical University of Berlin, Department of Mathematics and Natural Sciences, Dec. 8, 2014, 127 pages. (Submitted with English Abstract).

* cited by examiner

*Primary Examiner* — Sarah A. Slifka
(74) *Attorney, Agent, or Firm* — McCoy Russell LLP

(57) ABSTRACT

The present disclosure relates to a separator plate for an electrochemical system, wherein the separator plate has, at least in some regions, periodic surface structures with a mean spatial period of less than 10 μm. The disclosure additionally relates to a method for producing a separator plate for an electrochemical system, comprising the steps: providing a separator plate; irradiating the separator plate by means of a pulsed laser, wherein a pulse duration of the laser pulses is less than 1 ns; and creating periodic surface structures on the separator plate by way of the laser radiation.

12 Claims, 10 Drawing Sheets

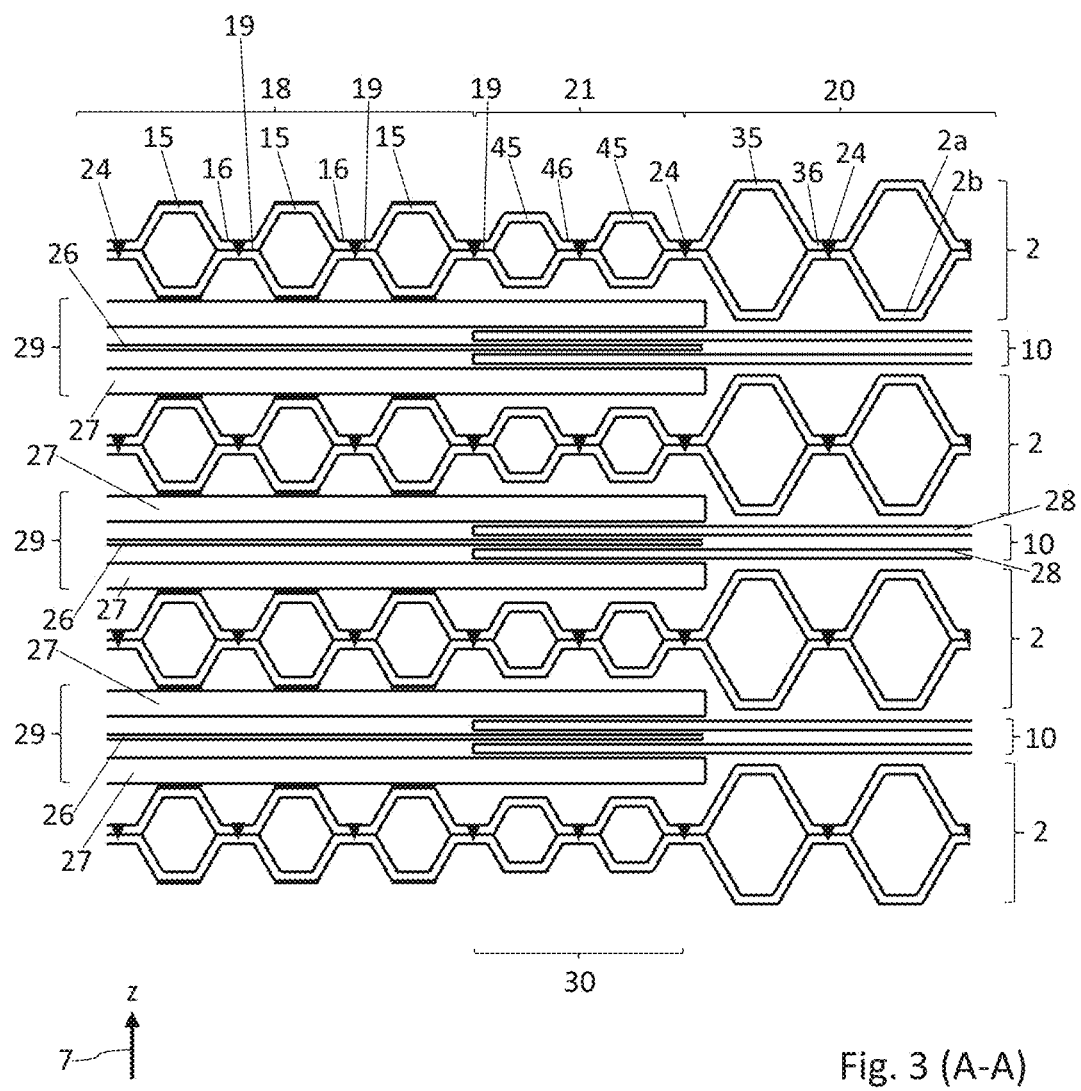
Fig. 3 (A-A)

↑
40

40
↘

(Enlarged)

A
100:1

B
100:1

D
100:1

SEPARATOR PLATE WITH PERIODIC SURFACE STRUCTURES IN THE NANOMETER TO MICROMETER RANGE

CROSS-REFERENCE TO RELATED APPLICATION

The present application claims priority to German Patent Application No. 10 2020 202 999.7, entitled "SEPARATOR PLATE WITH PERIODIC SURFACE STRUCTURES IN THE NANOMETER TO MICROMETER RANGE," and filed on Mar. 10, 2020. The entire contents of the above-listed application are hereby incorporated by reference for all purposes.

TECHNICAL FIELD

The present disclosure relates to a separator plate for an electrochemical system and to a method for producing such a separator plate. The electrochemical system may be a fuel cell system, an electrochemical compressor, an electrolyser or a redox flow battery.

BACKGROUND AND SUMMARY

Separator plates can have different functions depending on the field of application. On the one hand, they are used to ensure an electrically conductive connection to an adjoining layer, which may be for example a gas diffusion layer. On the other hand, separator plates are typically used to supply and/or remove reactants and/or reaction products, with a channel structure usually being provided for this purpose. In addition, reaction heat can be conveyed away by means of the separator plates, for example by means of a coolant. For mobile applications, such as in motor vehicles, it may be desired to produce separator plates from metal because the greater mechanical stability of metal compared to other materials allows a more compact design of fuel cells and fuel cell stacks.

However, a problem arises from the fact that metals which are suitable from an economic point of view, and which are sufficiently corrosion-resistant to withstand the aggressive conditions usually prevailing in fuel cells, tend to passivate. For example, stainless steel forms a passivation layer of chromium oxide, which initially results in corrosion resistance. However, a passivation layer leads to a significantly increased electrical contact resistance on a contact surface, thereby adversely affecting, to an extent beyond reasonable, the function of a separator plate to establish a low-loss electrical connection. Said aggressive reaction conditions also have a negative effect on the service life of the separator plates.

There is therefore a constant need to improve separator plates with regard to the corrosion resistance, electrical contact resistance, production costs and/or service life thereof.

Therefore, one object of the present disclosure is to specify a separator plate which solves at least one of said problems. Another object of the present disclosure is to specify a method by which such a separator plate can be produced.

This object is achieved by embodiments of the separator plate disclosed herein and by embodiments of the method for producing a separator plate. Advantageous embodiments of the present disclosure will become apparent from the features and from the description below.

Accordingly, a separator plate for an electrochemical system is provided. The separator plate has, at least in some regions, periodic surface structures with a mean spatial period of less than 10 µm. The mean spatial period may be at most 2 µm, or at most 1.5 µm.

Usually, the surface structures are arranged periodically with respect to one another at least in one spatial direction. The surface structures may also be arranged periodically with respect to one another in two spatial directions. According to some embodiments, the surface structures at least in some sections are arranged in parallel next to one another and/or in parallel one behind the other. The alignment may exist over relatively large or relatively small regions. The surface structures may extend parallel to one another at least within a region enclosed by a grain boundary. Different regions containing parallel surface structures, but in which there is a different orientation compared to another region, may also adjoin one another, for example at grain boundaries.

The shape of the structures on the surface thus repeats in at least one spatial direction. The spatial period typically denotes the maximum spacing between two adjacent surface structures of identical or similar shape. For reasons linked to production, the surface structures are usually not completely identical to one another. Rather, the period may be subject to fluctuations along the surface. A mean spatial period is therefore specified, which is less than 10 µm. It may also happen that the spatial period of the surface structures is in any case less than 10 µm.

Such periodic surface structures are typically created by means of laser radiation from an ultra-short pulse laser (see below) and are also known in the literature as "Laser-induced Periodic Surface Structures" (LIPSS). For further explanations, details and definitions regarding LIPSS, reference is made to the following publication:

"Dynamik der Erzeugung and Mechanismen der Entstehung von periodischen Oberflächenstrukturen im Nanometerbereich (LIPSS) durch die Bestrahlung von Festkörpern mit Femtosekunden-Laserpulsen" ["Dynamics of creation and mechanisms of formation of periodic surface structures in the nanometre range (LIPSS) by irradiation of solids with femtosecond laser pulses"], dissertation by Sandra Hoehm, Berlin, 2014 (hereinafter: Hoehm 2014), which is fully incorporated in this disclosure by way of reference. The separator plate is thus typically surface-treated by laser in the region of the periodic surface structures. The spatial period of the surface structures depends on the wavelength of the laser light used and is usually in the order of magnitude of the wavelength of the laser light used.

The inventors have found that said surface structures are suitable for use in separator plates of an electrochemical system. This is because surface properties of the separator plate can be modified in a targeted manner by the periodic surface structures. By way of example, chemical, electrical and/or mechanical properties of the surface can be influenced and/or improved by the surface structures.

The surface structures may extend for example in an undulating or linear manner along their longitudinal direction. In one embodiment, the surface structures may comprise depressions and/or elevations. The depressions may extend between the elevations and are usually delimited and/or formed by the latter. At least in some sections, the depressions and/or elevations may extend substantially parallel to one another (for example in parallel next to one another or one behind the other). The surface structures often form, at least locally, a trench structure comprising a plurality of elongated depressions which are oriented substantially parallel to one another. The number of surface structures, depressions and/or elevations can be varied according to requirements. For instance, the number of depressions may depend on the size of the surface that is to have the surface structures. In a region containing similar or identical surface structures, there are typically at least 10 or at least 20 trench structures, for example depressions, which extend parallel to one another at least in some sections. It is also possible to provide a different number of periods over a certain length in different regions in at least one spatial direction on the surface. If the surface structures are provided in the region of the channel structures of the separator plates, a different number of periods over a certain distance in one spatial direction may for example be provided in the elevated regions of the channel structures, for example the webs or sections of the channel side walls, than in the recessed regions of the channel structures, that is to say the channel bottoms and sections of the channel side walls.

The dimensions of the depressions, for example the period, usually depend at least on the wavelength of the laser radiation used. By way of example, the depressions have a depth of at least 8 nm, at least 20 nm, for example at least 50 nm and/or at most 3 µm, at most 1 µm, or at most 500 nm, at most 300 nm, usually at most 250 nm. The depth is usually measured normal to the surface formed by the elevations or normal to the surface of the separator plate that is free of the periodic surface structures. Furthermore, the depressions may have a width of at least 0.1 µm and/or at most 2 µm. The width is typically measured at half height and perpendicular to the local longitudinal direction of the depressions. In addition, the depressions may have a period in one spatial direction of at least 100 nm, usually at least 0.3 µm and/or at most 3 µm, at most 1.5 µm, at most 1.2 µm, or at most 1000 nm, typically at most 700 nm. The periodic surface structures thus often comprise nanostructures having a depth, width and/or period of in each case less than one micrometre or, with regard to the period, slightly more than one micrometre.

An oxygen content of the surface material may be greater in the region of the periodic surface structures than outside of the periodic surface structures. This is advantageous if the surface has a high chromium content compared to the iron content, so that the increased oxygen content causes a thicker passive layer. The corrosion resistance can be increased by this thicker passive layer. The surface structure may therefore have an increased oxygen content compared to the material prior to the laser irradiation or compared to material in regions with no surface structuring. This can be attributed for example to an increase in temperature during the irradiation.

Despite a possible higher oxygen content, the surface structures may lead to a reduction in the electrical contact resistance and/or to an increase in the electrical conductivity. The separator plate may thus have a greater electrical conductivity and/or a lower electrical resistance in the region of the periodic surface structures than outside of the periodic surface structures.

The separator plate may also have a coating, which may differ from the material of the separator plate. The coating may be provided for example in some regions or across the entire surface. By way of example, at least the regions provided with the periodic surface structures are provided with a coating at least in some sections or completely, for example with a coating that increases the electrical conductivity. The coating may contain one or more of the following substances or may consist of one or more of said substances or alloys thereof: electrically conductive oxides, carbon, electrically conductive carbon layers, noble metals, such as Au, Ag or Pt, metals, such as Ti or Cr, metal nitrides, for example TiN, CrN, Cr2N, metal carbides, metal borides, metal silicides and/or silicon carbide. The electrical conductivity is based not only on the separator plates, but rather is typically compared on the basis of a comprehensive system consisting of two separator plates, which are connected to one another, and gas diffusion layers or gas diffusion media arranged on both sides of said composite. For testing purposes, it is also possible for just one sheet-metal layer, such as that used for a separator plate, to be measured in combination with gas diffusion media, which are usually applied to both sides.

The separator plate usually has two opposite flat sides. In certain embodiments, the surface structures may be provided on only one of the flat sides or on both flat sides. In one embodiment, at least one of the flat sides is provided with the surface structures across the entire surface. In other embodiments, only one region or a number of regions of the separator plate have the surface structures. Therefore, there may be at least one region that is free of the periodic surface structures. The two flat sides of the separator plate may comprise a reactant side or gas side and a coolant side. The surface structures may be arranged on the reactant side or gas side of the separator plate. In addition or as an alternative, the surface structures may be arranged on the coolant side of the separator plate.

The separator plate may be configured as a metal separator plate, wherein the separator plate may be manufactured from a metal sheet, such as a stainless-steel sheet. The separator plate usually comprises a flow field for guiding a reaction medium along a flat side of the separator plate. In one embodiment, the surface structures are provided in the region of the flow field. According to one example, the surface structures are provided only in the region of the flow field, and in some embodiments, only in an electrochemically active region of the flow field. In another embodiment, the separator plate has a plurality of webs and channels formed between the webs. The webs and the channels may form the flow field for guiding the reaction medium along one of the flat sides of the separator plate. The webs typically form a contact surface, for bearing against a diffusion layer. In some embodiments, at least the webs have the surface structures. The surface structures may also be present outside of the webs, for example in the region of the channels. Alternatively, only the webs have the surface structures, for example in the region of said contact surface. It has surprisingly been found that an electrical resistance in the region of the contact surface can be reduced as a result of the surface structures. In other words, the electrical resistance in the region of the contact surface between the webs and the diffusion layer may be greater if no surface structures are formed on the webs.

Also on the opposite surface of the separator plate, webs may be formed on the rear side of channels, said webs hereinafter being referred to as rear webs. In the assembled state, said rear webs come to lie against comparable rear webs. Here, too, it has been found that the electrical resistance of the contact surface can be reduced as a result of the surface structures.

The partial surface laser treatment in the form of a treatment only of the webs and/or rear webs may extend substantially across the entire surface of the respective web or rear web. However, it is also possible to provide only sections of a web or rear web with surface structures by means of laser.

A bipolar plate for an electrochemical system is also provided by the present disclosure, said bipolar plate includes two of the separator plates described above, which are joined together and may be tightly connected, for example tightly welded, with respect to the surrounding environment. The webs of the two separator plates in each case form a contact surface for bearing against the gas diffusion layer. Rear webs are formed on the rear sides of the channels, that is to say on the inwardly facing surfaces of the separator plates, wherein the two separator plates typically rest against one another in the region of said rear webs. The contact surfaces, both from a web to a gas diffusion layer and also on adjoining rear webs, may, if laser-structured, have a lower electrical resistance in the region of the surface structuring.

The separator plate may be configured to guide a coolant. To this end, the separator plate may have a plurality of cooling channels, which may be on a flat side of the separator plate opposite the flow field of a reaction medium, that is to say in the interior of the bipolar plate. In this case, the two separator plates usually are not only connected to one another in a fluid-tight manner along and at a distance from their outer edge, but rather have materially bonded connections, for example welded joints, in the electrochemically active region of the flow field, more specifically in their contact zones formed by the webs, in order to improve the conductivity. It has been found that, also at this interface, the resistance can also be reduced by means of the surface structures. Therefore, in some embodiments, surface structures are present also on the coolant side of a separator plate, across the entire surface or in some sections, for example in the region of the contact surfaces between the separator plates, that is to say on the aforementioned rear webs. The surface structures may therefore be present on one or both surfaces of the separator plate, that is to say on the coolant side and/or on the reactant side.

As mentioned above, the surface structures can lead to a significant reduction in the electrical contact resistance and/or to a significant increase in the electrical conductivity. By virtue of this improvement in the electrical conductivity, it has been found that the materially bonded connections, such as the aforementioned welded joints in the contact zones, can even be omitted. In one embodiment, therefore, the bipolar plate may be free of materially bonded connections, such as welded joints, within the flow field or within the electrochemically active region on the coolant side and in said contact zones of the two separator plates where the surface structures are arranged. In this case, the contact zones are usually formed by the rear webs of the separator plates. For example, the surfaces of the coolant side may also be free of conductivity-increasing coatings.

An electrochemical system comprising a plurality of such separator plates or bipolar plates is also proposed by the present disclosure. The electrochemical system may for example be a fuel cell system, an electrochemical compressor, an electrolyser or a redox flow battery.

Known electrochemical systems of said type normally comprise a stack of electrochemical cells, which are each separated from one another by bipolar plates. Such bipolar plates may serve for example to electrically contact the electrodes of the individual electrochemical cells (for example fuel cells) and/or to electrically connect adjacent cells (connecting the cells in series). Typically, the bipolar plates are formed of two joined individual plates, which are also referred to as separator plates within the scope of the present document. The single plates may be joined together in a materially bonded manner, for example by one or more welded joints, or by one or more laser-welded joints.

The bipolar plates or the separator plates may each have or form structures, which are configured for example to supply one or more media to the electrochemical cells arranged between adjacent bipolar plates and/or to remove reaction products. The media may be fuels (for example hydrogen or methanol), reaction gases (for example air or oxygen) or coolants. Furthermore, the bipolar plates may be configured for the onward conduction of the waste heat generated during the conversion of electrical and/or chemical energy in the electrochemical cell, as well as for sealing off the various media channels and/or cooling channels with respect to one another and/or with respect to outside.

Furthermore, the bipolar plates usually each have at least one through-opening, through which the media and/or the reaction products can be routed to and/or led away from the electrochemical cells arranged between adjacent bipolar plates of the stack. The electrochemical cells also typically each comprise one or more membrane electrode assemblies (MEAs). In addition, gas diffusion layers may be provided, which are usually arranged in each case between the MEA and the bipolar plate and are configured for example as a non-woven metal or carbon fabric.

A method for producing a separator plate for an electrochemical system is also provided by the present disclosure. The method comprises the steps:
    providing a separator plate;
    irradiating the separator plate by means of a pulsed laser, wherein a pulse duration of the laser pulses is less than 1 ns, less than 100 ps; and
    creating periodic surface structures on the separator plate by way of the laser radiation.

In this case, said plurality of periodic surface structures is typically created within a spatially contiguous projection of the respective laser pulse onto the separator plate. A plurality of periodic surface structures can be created per laser pulse. The creation of each periodic surface structure by the respective laser pulse can be completed before the next laser pulse hits. At least 5 or at least 10 or at least 20 periodic surface structures, that is to say trench structures, can be created per laser pulse. The periodic surface structures are thus created by each laser pulse within the contiguous surface irradiated by the respective laser pulse and not, for example, by the separator plate being scanned in a spatially periodic manner or being irradiated with a spatially periodic, non-contiguous light pattern, such as a diffraction pattern or interference pattern.

The laser pulses may have a pulse duration of less than 1 ns, less than 100 ps, less than 10 ps, or for example less than 1 ps. The laser pulses may have a pulse frequency of 1 MHz or less. For example, it is advantageous if the ratio of pulse frequency to pulse duration is at least 1000. Due to this short pulse duration and the low pulse frequency in comparison thereto, on the one hand very high intensities can be achieved, which is required in order to ablate the surface and/or rearrange the surface material. On the other hand, the short pulse duration in interaction with the considerable dead times makes it possible for the surface material to be machined largely without heat diffusion, and thus for the periodic surface structures to be created.

In some embodiments, the pulse duration is less than 100 ps, less than 50 ps, less than 20 ps, less than 10 ps, or even less than 1 ps. In some embodiments pulse durations in the fs range are used, for example greater than 30 fs and/or less than 1000 fs and/or less than 500 fs, or greater than 50 fs and/or greater than 100 fs. For example, therefore, picosecond or femtosecond lasers, which are collectively referred to as ultra-short pulse lasers, can be used for the method.

The surface structures usually have the form of a periodic trench structure, the shape of which depends on the process parameters. Possible process parameters are disclosed for example in Hoehm 2014.

For example, the periodic surface structures may be created as a result of the incident laser radiation interacting with the irradiated surface. The interaction leads to a spatially modulated inward coupling of energy into the material, which then leads to the periodic surface structures as a result of ablation. The periodic surface structures are typically brought about by optical interference of the incident laser radiation with an electromagnetic surface wave in the material of the separator plate that is generated by the laser pulse. A fluence of the laser radiation is typically in the order of magnitude of the ablation threshold of the material used for the separator plate. The fluence of the laser light should be at least so large that ablation of the material is possible. The fluence may for example be selected such that it differs by at most 20% from the ablation threshold of the material used for the separator plate. The fluence is a measure of the energy density of the laser pulses and is generally specified in J/cm2. The fluence may be for example at least 0.1 and/or at most 10.0 J/cm2. The repetition rate of the laser may be for example at least 10 Hz, at least 1 kHz and/or at most 1000 kHz, or at most 20 kHz. The low repetition rate results in considerable dead times, so that the total energy input is limited and only the surface layer is modified.

According to one embodiment, the laser radiation is linearly polarized. The surface structures are typically oriented perpendicular to a polarization direction of the incident laser radiation. This applies to core regions of the irradiated area and to regions which extend within the grain boundaries of the untreated sheet. In regions which adjoin one another, but which are separated from one another by a grain boundary, the surface structures may in contrast be oriented differently. A mean spatial period of the surface structures may be at least 2%, at least 5%, at least 20% and/or at most 200%, or at most 120% of the laser wavelength used. The separator plate may thus have different regions which each contain periodic structuring, but with a different orientation in the different regions. In this case, said regions may adjoin one another.

The most common LIPSS are referred to in the literature as "Low Spatial Frequency LIPSS" (LSFL) (see Hoehm 2014). LSFLs have an orientation perpendicular to the polarization of the laser beam and a period in the region of the wavelength of the laser used. Due to the angle of incidence relative to the surface, it is possible both for the period to be varied on account of the projection and for the orientation of the LIPSS to be rotated through an angle of up to 90°. It has been reported in the literature that the period P of LSFLs is in the order of magnitude of the wavelength $\lambda$, of the incident laser radiation (cf. Hoehm 2014), that is to say for example P≈$\lambda$. LIPSS of a second type, the so-called HSFLs ("High Spatial Frequency LIPSS"), have significantly smaller periods $P_{HSFL}$ compared to the laser wavelength ($P_{HSFL} \ll \lambda$). The orientation thereof is coupled to the polarization of the radiation in a manner depending on the material, and is usually oriented either parallel or perpendicular thereto.

According to this variant, the surface structures are created by means of a single laser beam. The surface of the separator plate can be successively scanned by the laser beam.

The laser beam or laser pulse that hits the separator plate may have a beam diameter or a smallest lateral size of at least 20 µm, or at least 40 µm. In other words, the contiguous projection of the laser beam onto the separator plate, which can also be referred to as the laser spot, may have said beam diameter or said smallest lateral size of at least 20 µm, or at least 40 µm. When using a line-type laser, the laser line may have a width (smallest lateral size) of at least 20 µm, or at least 40 µm.

In another embodiment, at least two laser beams, for example at least two linearly polarized laser beams, are superimposed. By superimposing the laser beams, an interference pattern can be formed for creating the surface structures. A diffraction pattern can also be used to create the surface structures. By using the interference pattern or diffraction pattern, the surface of the separator plate does not have to be scanned by just one laser beam. The method can therefore be carried out much more quickly overall. For this purpose, the laser beam of a laser may be split into two partial beams. The interference pattern or diffraction pattern usually comprises a plurality of spatially non-contiguous light spots. It should be noted here that the spatial period of the periodic surface structures is established not by the spatial period of the interference or diffraction pattern of the laser radiation, but rather by the interaction of the short laser pulse with the separator plate, see also above. The spatial period of the surface structures therefore differs from the spatial period of the interference pattern or diffraction pattern of the laser radiation and is usually significantly smaller, for example 10 times smaller.

Comparative measurements between untreated single sheets and single sheets surface-treated on both sides by a laser, that is to say single sheets without a stamped channel structure, have in each case shown a reduction in the volume resistance when bearing on both sides against a gas diffusion layer from the same batch with compression by the same pressure. However, the reduction in the volume resistance on the sheets with LSFL structures, showing an average reduction of 87%, is significantly more pronounced than on the sheets with HSFL structures, which show only an average reduction of 76%. All the single plates used for this were stainless-steel sheets from the same batch. Here and below, changes in the contact resistances of the surfaces are derived from the changes in the volume resistances.

In addition, the separator plate may be provided with a coating. The coating of the separator plate may take place once the surface structures have been formed. In one embodiment of the method, at least the regions provided with the periodic surface structures may be coated with a coating at least in some sections or completely. For example, the separator plate may be coated with a coating that increases the electrical conductivity. The electrical conductivity is typically based not only on the separator plates, but rather is compared on the basis of a bipolar plate consisting of two separator plates, which are connected to one another, on which gas diffusion layers or gas diffusion media are arranged on both sides. For testing purposes, it is also possible for just one sheet-metal layer, such as that used for a separator plate, to be measured in combination with gas diffusion media, which are usually applied to both sides.

It may be provided that the coating takes place by means of a plasma-based method, for example by means of PVD (physical vapour deposition), CVD (chemical vapour deposition) or PA-CVD (plasma-assisted CVD). Other methods for applying the coating to the separator plate include for example spraying, brush plating, screen printing, roller printing, stencil printing or metering processes.

The method may comprise the following additional step: removing sections of a coating by means of a further laser treatment. This coating may comprise the coating mentioned above or another coating. For this, a removal by means of the same laser is possible; alternatively, another laser can be used to remove the coating. The coating may be removed before the surface structures are created and may be removed in some sections, for example if materials which are coated across the entire surface are used as the starting material.

The separator plate may have a plurality of webs and channels formed between the webs. At least the webs may be irradiated with the laser. As a result, the surface structures can be created on the webs. For further properties of the separator plate, reference is made to the description above.

It should be noted that, according to said method, the steps of forming the flow field and irradiating the separator plate by means of the pulsed laser can be swapped. It may therefore be provided that the surface structuring of the separator plate takes place before or after the sheet has been shaped to form the flow field. The flow field is typically formed by deep-drawing or stamping the separator plate.

The method can be used to produce the separator plate described above. Features which have been mentioned only in relation to the separator plate or the bipolar plate or the electrochemical system can also be claimed for the method, and vice versa.

BRIEF DESCRIPTION OF THE FIGURES

Exemplary embodiments of the separator plate, the bipolar plate and the electrochemical system are shown in the figures and will be explained in greater detail on the basis of the following description. In the figures:

FIG. 3 shows a sectional view through an electrochemical system along a section line A-A shown in FIG. 2;

FIGS. 1-8B and 11-13 are shown approximately to scale.

Here and below, features which recur in different figures are denoted by the same or similar reference signs.

DETAILED DESCRIPTION

Figure 1:
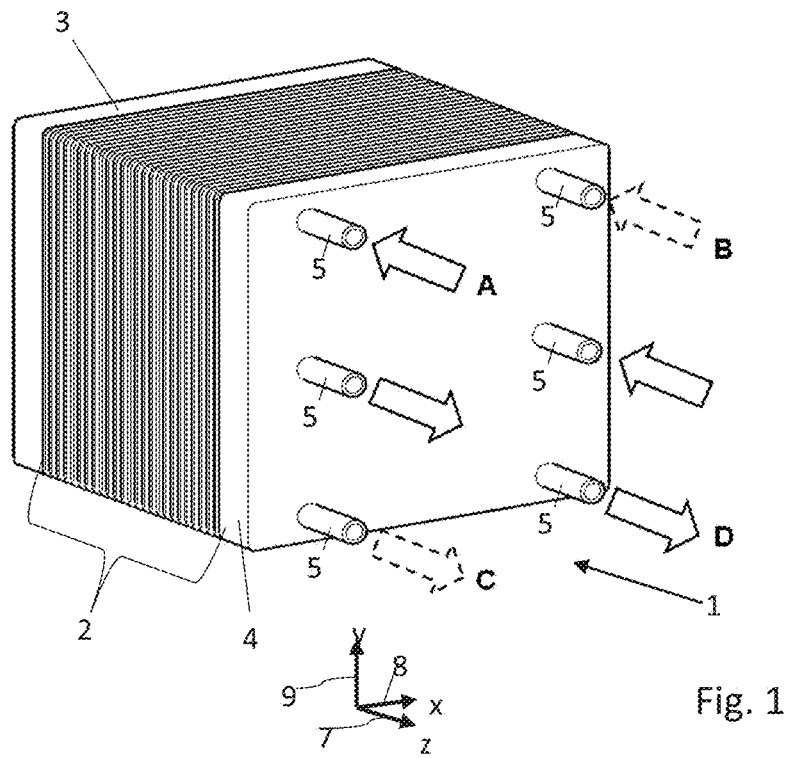
FIG. 1 schematically shows a perspective view of an electrochemical system comprising a plurality of bipolar plates.

FIG. 1 shows an electrochemical system 1 of the type proposed here, comprising a plurality of structurally identical metal bipolar plates 2 which are arranged in a stack and are stacked along a z-direction 7. The bipolar plates 2 of the stack are clamped between two end plates 3, 4. The z-direction 7 will also be called the stacking direction. The bipolar plates 2 usually each comprise two metal separator plates 2a, 2b which are connected to one another (see for example FIGS. 2 and 3). In the present example, the system 1 is a fuel cell stack. Each two adjacent bipolar plates 2 of the stack therefore enclose an electrochemical cell therebetween, which serves for example to convert chemical energy into electrical energy. The electrochemical cells usually each have a membrane electrode assembly (MEA) 10 (see for example FIGS. 2 and 3). The MEA typically contains in each case at least one membrane, for example an electrolyte membrane. Furthermore, a gas diffusion layer (GDL) may be arranged on one or both surfaces of the MEA.

In alternative embodiments, the system 1 may also be configured as an electrolyser, electrochemical compressor or as a redox flow battery. Bipolar plates can also be used in these electrochemical systems. The structure of these bipolar plates may then correspond to the structure of the bipolar plates 2 explained in detail here, even though the media guided on or through the bipolar plates in the case of an electrolyser, in the case of an electrochemical compressor or in the case of a redox flow battery may differ from the media used for a fuel cell system. The same applies to the separator plates.

The z-axis 7, together with an x-axis 8 and a y-axis 9, spans a right-handed Cartesian coordinate system. The bipolar plates 2 and separator plates 2a, 2b each define a plate plane, wherein the plate planes of the separator plates 2a, 2b are each oriented parallel to the x-y plane and thus perpendicular to the stacking direction or to the z-axis 7. The end plate 4 has a plurality of media ports 5, via which media can be supplied to the system 1 and via which media can be discharged from the system 1. These media that can be supplied to the system 1 and discharged from the system 1 may comprise for example fuels such as molecular hydrogen or methanol, reaction gases such as air or oxygen, reaction products such as water vapour or depleted fuels, or coolants such as water and/or glycol.

Figure 2:
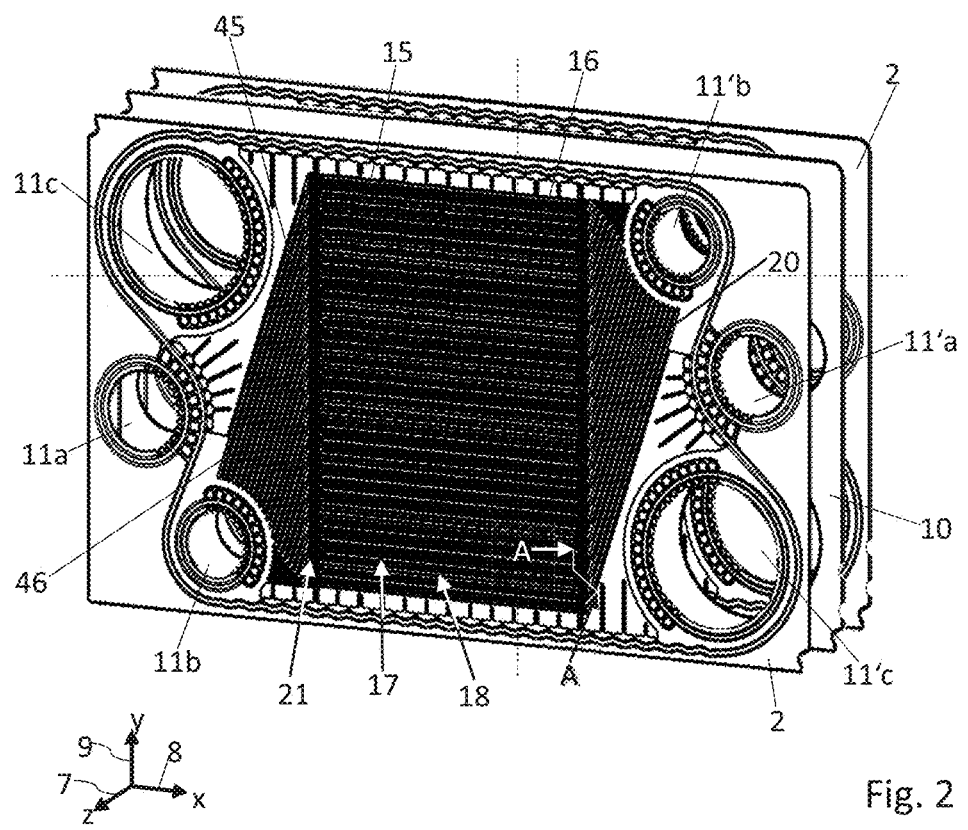
FIG. 2 schematically shows, in a perspective view, two bipolar plates for an electrochemical system of the type shown in FIG. 1 and a membrane electrode assembly arranged between the bipolar plates.

FIG. 2 shows, in a perspective view, two bipolar plates 2 known from the prior art, as can be used for example in electrochemical systems of the type shown in FIG. 1. FIG. 2 also shows a membrane electrode assembly (MEA) 10 arranged between said adjacent bipolar plates 2, the MEA 10 in FIG. 2 being largely obscured by the bipolar plate 2 facing towards the viewer. The bipolar plate 2 is formed of two single plates, namely separator plates 2a, 2b, which are joined together in a materially bonded manner (see for example FIG. 3), of which in each case only the first single plate, which faces towards the viewer and obscures the second single plate, is visible in FIG. 2. The single plates may each be formed of a shaped metal sheet, for example of a stamped or deep-drawn stainless-steel sheet. This metal sheet may have for example a thickness of at most 150 µm, at most 100 µm, at most 90 µm, or at most 80 µm. The single plates may be welded to one another, for example by laser-welded joints.

The single plates usually have through-openings, which are aligned with one another and form through-openings 11a-c of the bipolar plate 2. When a plurality of bipolar plates 2 are stacked, the through-openings 11a-c, 11'a-c form media channels, which extend in the stacking direction 7 through the stack of the system 1 (see FIG. 1). Each of the media channels formed by the through-openings 11a-c, 11'a-c is typically fluidically connected to one of the ports 5 in the end plate 4 of the system 1. For example, coolant can be introduced into the stack via the media channels formed by the through-openings 11a and can be discharged from the stack via the through-openings 11'a. In contrast, the lines formed by the through-openings 11b, 11c may be configured to supply the electrochemical cells of the fuel cell stack of the system 1 with fuel and with reaction gas, while the lines formed by the through-openings 11'b, 11'c may be configured to discharge the reaction products from the stack.

The first separator plates have, on the front side thereof facing towards the viewer of FIG. 2, a flow field 17 comprising structures for guiding a reaction medium along the front side of the separator plate. The electrochemically active region 18 forms part of this flow field 17. These structures of the electrochemically active region 18 are shown in FIG. 2 by a plurality of webs 15 and channels 16, said channels extending between the webs 15 and being delimited by the webs 15. On the rear sides of the channels, that is to say on the opposite surface of the separator plate, rear webs 19 are formed, in the region of which the separator plates 2a, 2b bear against one another. On the front side of the bipolar plates 2, facing towards the viewer of FIG. 2, the first separator plates 2a each additionally have a distribution and a collection region 20 for reaction medium, opposite which there is a distribution and a collection region for coolant (not visible) on the rear side of the separator plate 2a, that is to say on the inner side of the bipolar plate 2. The distribution region 20 comprises structures which are configured to distribute across the active region 18 a medium that is introduced into the distribution region 20 from a first 11b of the through-openings 11a, 11b, 11c, while the collection region 20 comprises structures which are configured to collect or pool a medium that flows from the active region 18 to a first 11'b of the through-openings 11'a, 11'b, 11'c. To this end, the distribution and collection regions 20 have guide structures, which in FIG. 2 are defined by webs 35 and channels 36 formed between the webs 35. The channels 16 may each be fluidically connected to one of the through-openings 11b, 11'b via the channels 36. The electrochemically active region 18 is thus fluidically connected to the through-openings 11b, 11'b via the distribution and collection regions 20.

The structures of the active region 18 and the guide structures of the distribution region 20 and of the collection region 20 are each formed in one piece with the separator plates 2a and are integrally formed in the separator plates 2a, 2b, for example in a stamping, hydroforming or deep-drawing process. The same usually applies to the corresponding guide structures of the second separator plates 2b. The guide structures of the flow field 17 may comprise a plurality of webs 15 and optionally channels 16 formed between the webs 15 in the electrochemically active region 18, as well as a plurality of webs 35 and optionally channels 36 formed between the webs 35 in the distribution and collection region 20.

Also shown in FIG. 2 are two rectangular edge regions 21 of the flow field 17, which are arranged at the ends of the electrochemically active region 18 facing towards the distribution and collection region 20 and extend in the longitudinal direction across the entire width of the flow field 17, here transversely to the course of the channels 16 of the flow field 17. In the stack of the system 1, said edge regions 21 each serve to accommodate and bear an enhanced range of membrane electrode assemblies (MEAs) 10. The edge region 21 will hereinafter be referred to as the transition region 21. As can be seen in FIG. 3, the transition region 21 is sunken in comparison to the active region 18 (flow field 17) and in comparison to the distribution or collection region 20, as a result of which the separator plate 2a, b 2b or the bipolar plate 2 as well as the MEA 10 has an optimal compression in the stack. More details are published in WO 2018/114819 A1, which is incorporated in this document by way of reference.

FIG. 3 shows a sectional view of a portion of the stack of the electrochemical system 1 of FIG. 1. The stack comprises a plurality of structurally identical bipolar plates 2 of the same type as the bipolar plate 2 shown in FIG. 2. The sectional plane is oriented perpendicular to the flat surface planes of the bipolar plates 2 or the separator plates 2a, 2b and follows the line A-A highlighted in FIG. 2. The active regions 18, the transition regions 21 and the distribution or collection regions 20 of the separator plates 2a, 2b or bipolar plates 2 are highlighted.

A membrane composite 29 is arranged in each case between two adjacent bipolar plates 2 of the stack, each membrane composite having a membrane electrode 26 comprising an ionomer and at least one catalyst layer, gas diffusion layers 27 arranged on both sides of the membrane electrode 26, and reinforcing layers 28 arranged in some sections on both sides of the membrane electrode 26. The membrane electrode 26 and the reinforcing layers 28 together form the membrane electrode assembly (MEA) 10. Purely for the sake of clarity, FIG. 3 shows the stack in a state in which the bipolar plates 2 and the membrane composites 29 are not fully compressed along the z-direction 7, that is to say perpendicular to the flat surface planes of the bipolar plates 2 or the separator plates 2a, 2b.

In the region of the flow field 17, that is to say in the electrochemically active region 18 of the bipolar plates 2, the membrane composites 29 each comprise only the membrane electrode 26 and the gas diffusion layers 27 arranged on both sides of the membrane electrode. The membrane electrode 26 has a catalyst coating on both sides. In the region of the distribution or collection region 20, the membrane composites 29 each comprise only the two reinforcing layers 28, which are usually connected to one another. Only in the region corresponding to the transition region 21 of the separator plates 2 do each of the membrane composites 29 have a reinforced region 30, which in each case comprises the membrane electrode 26, the reinforcing layers 28 arranged on both sides of the membrane electrode 26, and the gas diffusion layers 27 arranged on both sides of the membrane electrode 26 and on both sides of the reinforcing layers 28. The reinforced region 30 of the membrane composite 29 typically forms an edge of the electrochemically active region of the membrane composite 29. Also in the transition region 21, the separator plates have webs 45 with channels 46 formed between the webs 45.

The separator plates 2a, 2b usually contact one another in contact regions, which are formed by the rear sides of the depressions 16, 36, 46, and bear flat against one another there. To improve the electrical conductivity and/or to reduce the volume resistance in the active region 18 and optionally also in the transition region 21, the separator plates 2a, 2b are usually connected there by means of materially bonded connections, such as laser-welded joints 24. In the distribution region 20, on the other hand, laser-welded joints may be used to avoid local swelling of the channels, that is to say to clearly define the volumes available for the fluid flow. The laser-welded joints 24 are therefore provided for example in the flow field 17, in the electrochemically active region 18, in the transition region 21 and in the distribution region 20, or in the contact zones or contact regions thereof. In the x-direction for example (that is to say parallel to the cooling fluid flow direction), the welded joints 24 may form continuous welds or alternatively stitch welds, which each comprise a row of linear weld sections, for example spaced apart from one another.

According to the present disclosure, the separator plate 2a, 2b has, at least in some regions, periodic surface structures 40 with a mean spatial period of less than 10 μm. The surface structures 40 are thus arranged at periodic spacings. The periodic surface structures 40 are brought about on the surface of the separator plate 2a, 2b by irradiation by means of an ultra-short pulse laser. For example, one contiguous region or a number of contiguous regions of the separator plate 2a, 2b may have the periodic surface structures 40. The periodic surface structures 40 will be further explained below with reference to FIGS. 4 to 6H.

Figure 4A:
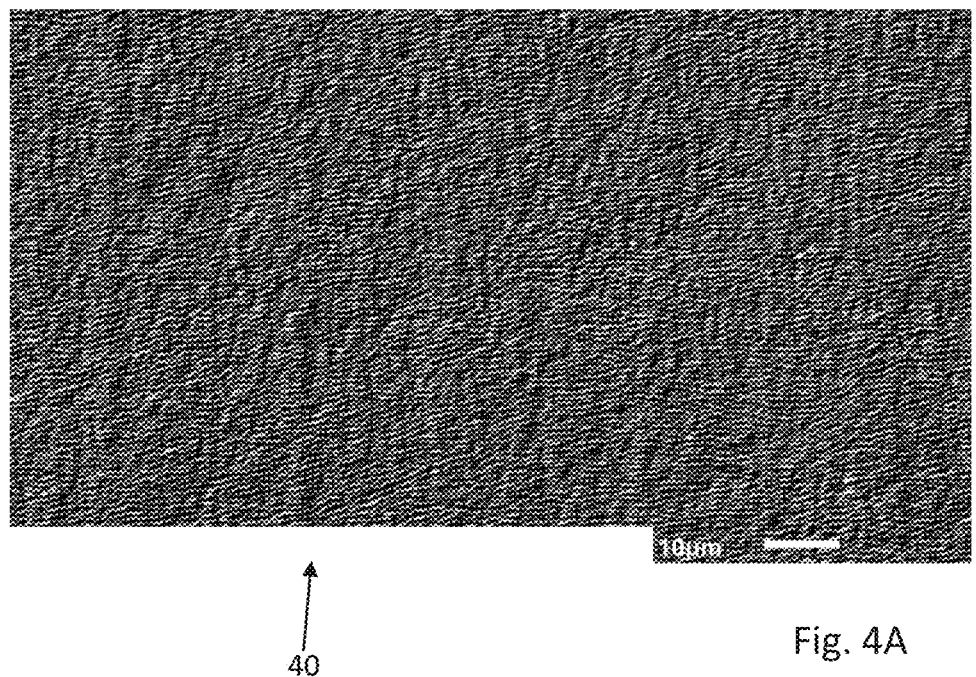
FIG. 4A shows a microscopic image of periodic surface structures in plan view.
Figure 4B:
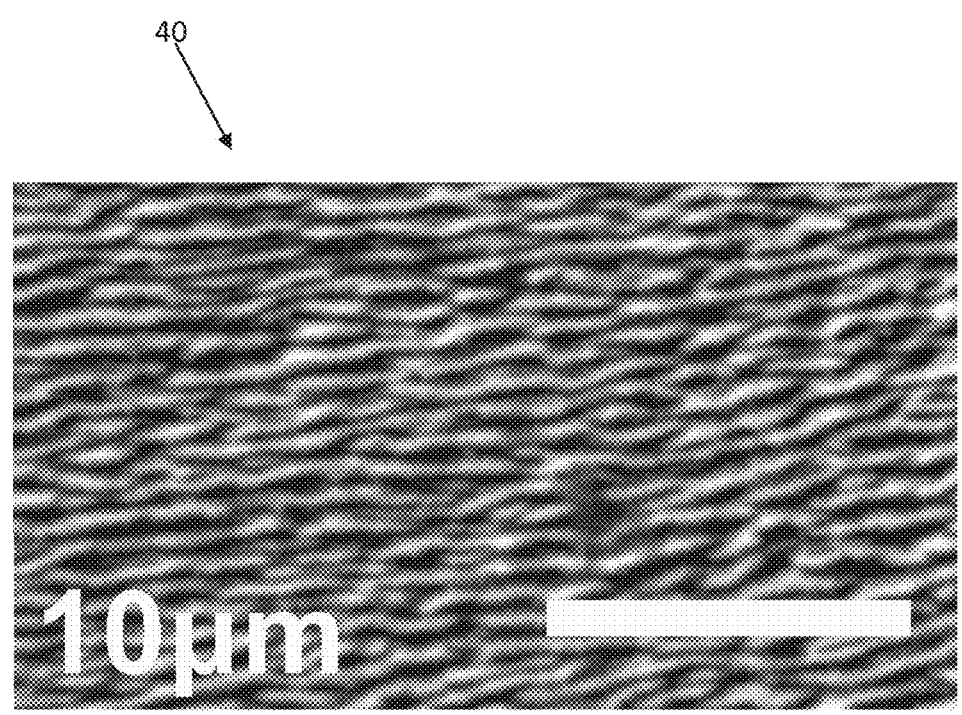
FIG. 4B shows a detail from FIG. 4A.
Figure 5:
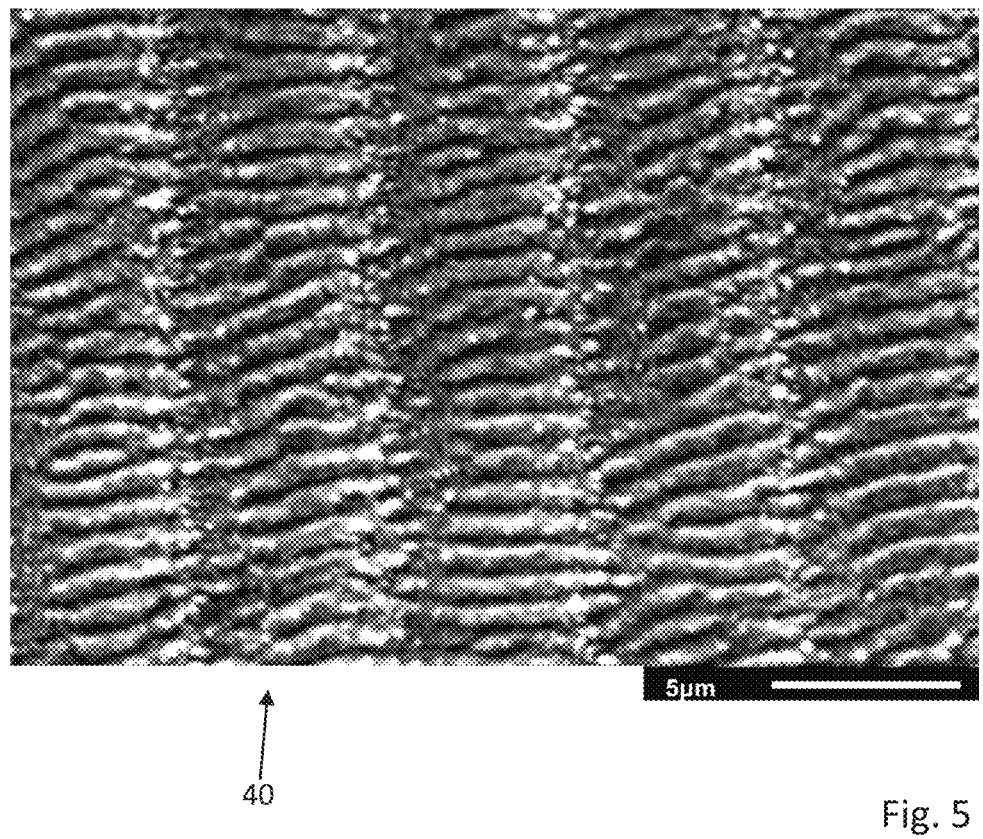
FIG. 5 shows a microscopic image of periodic surface structures in plan view.

FIGS. 4A, 4B and 5 show greatly enlarged images of periodic surface structures 40 which are formed on the surface of a metal sheet, such as a stainless-steel sheet, by a laser surface treatment. The enlarged excerpts may be excerpts from surfaces of a separator plate or from a metal sheet for a separator plate. The stainless-steel sheet may be shaped to form a separator plate 2a, 2b by stamping, hydroforming or deep drawing. Alternatively, the separator plate 2a, 2b is first formed by stamping, hydroforming or deep drawing and then is provided with the periodic surface structures 40 (see the production method below).

The surface structures 40 may be present on one and/or both sides of the separator plate 2a, 2b, that is to say on the coolant side and/or on the reactant side/gas side.

As can be seen from FIGS. 4-6H, the periodic surface structures 40 (hereinafter: surface structures 40) may comprise a plurality of depressions 42 and elevations 44. The depressions 42 extend between the elevations 44 and are delimited and/or formed by the latter. The surface structures 40 are arranged periodically with respect to one another in at least one spatial direction x, y. For instance, the surface structures 40 may be aligned with one another along their longitudinal direction. For example, the surface structures 40, that is to say the depressions 42 and the elevations 44, extend substantially parallel to one another. The surface structures 40 may be arranged in parallel next to one another and/or one behind the other. For example, it can be seen in FIGS. 6C, 6F that the surface structures 40 are arranged in parallel next to one another, that is to say perpendicular to the longitudinal direction of the surface structures. Furthermore, FIG. 5 shows that surface structures 40 are arranged both in parallel one behind the other (one after the other in the longitudinal direction) and in parallel next to one another. Such surface structures 40 can likewise be seen in FIGS. 6B and 6H.

Figure 6A:
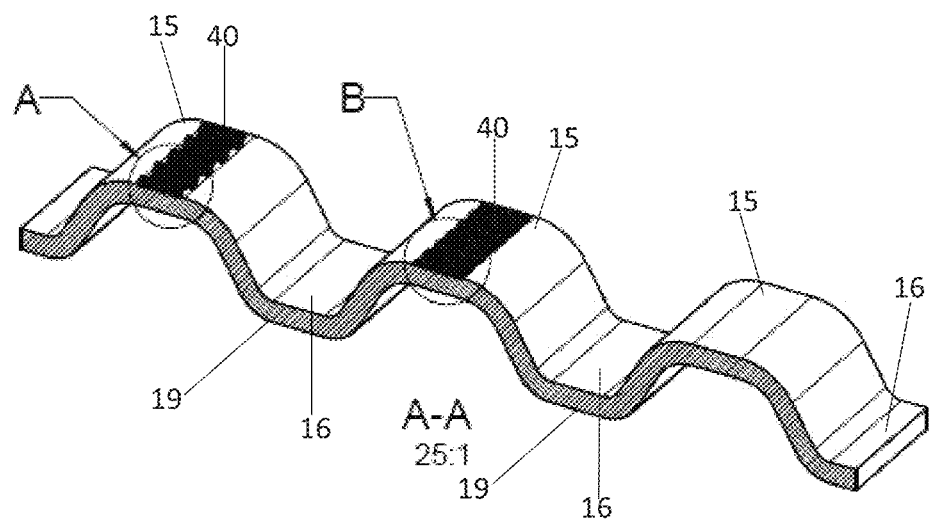
FIG. 6A schematically shows a portion of a separator plate in a perspective view.
Figure 6B:
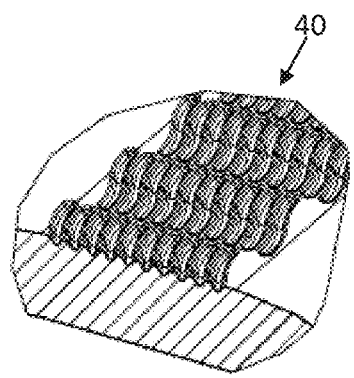
FIG. 6B shows detail A from FIG. 6A.
Figure 6C:
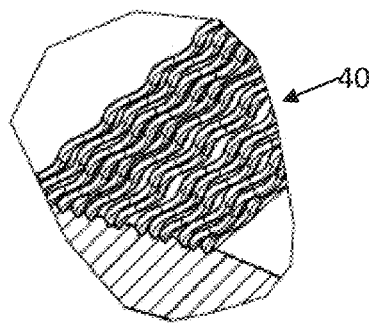
FIG. 6C shows detail B from FIG. 6A.
Figure 6D:
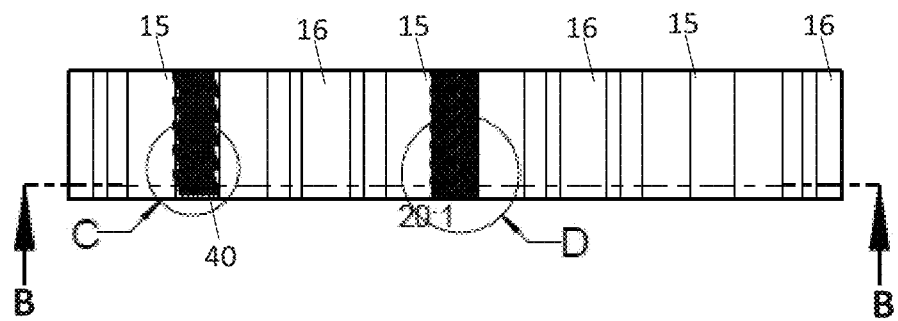
FIG. 6D schematically shows a plan view of the portion of the separator plate from FIG. 6A.
Figure 6E:
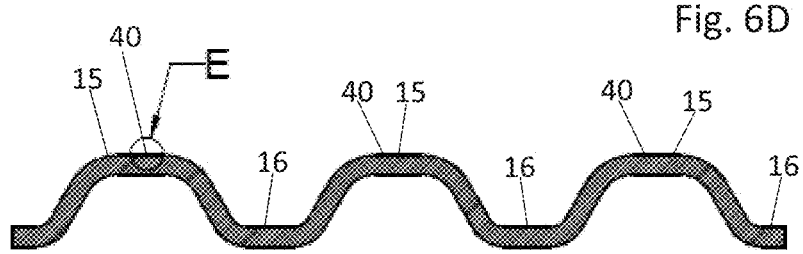
FIG. 6E schematically shows a cross-section of the separator plate along a section line B-B shown in FIG. 6D.
Figure 6F:
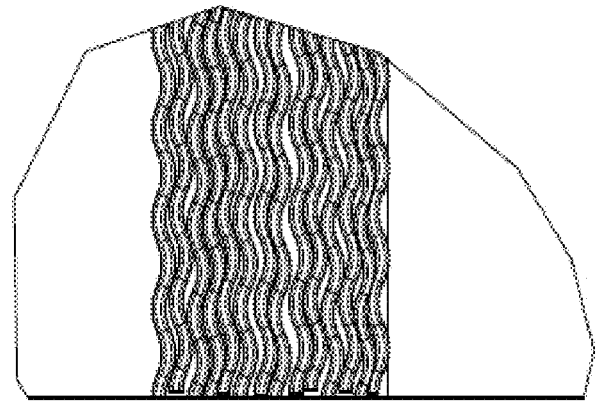
FIG. 6F shows detail D from FIG. 6D.

The surface structures 40 may extend for example in an undulating or linear manner along their longitudinal direction. One example of an undulating extension of the surface structures 40 is shown in FIGS. 6C and 6F.

Figure 6G:
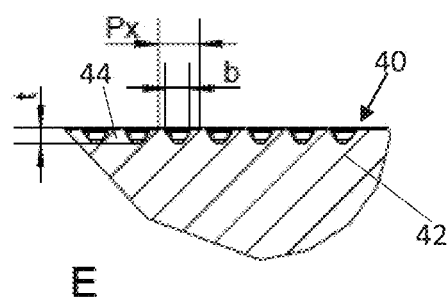
FIG. 6G shows detail E from FIG. 6E.

FIG. 6G shows a depth t, a width b and a period Px of the surface structures, for example of the depressions 42. The surface structures 40 may have a depth t of at least 8 nm, at least 50 nm and/or at most 3 μm, or at most 1 μm, at most 500 nm and/or at most 300 nm and/or at most 250 nm. In the present example, it is for example t=0.4 μm or t=100 nm. In one exemplary embodiment, the surface structures 40 have a width b of at least 0.1 μm and/or at most 2 μm. In the present example, it is b=0.45 μm. In addition, the surface structures 40 may have a period Px in one spatial direction x of at least 0.3 μm and/or at most 3 μm. In the present example, it is 1 μm. In FIG. 6G, the period Px denotes the lateral spacing between two adjacent elevations 44.

Figure 6H:
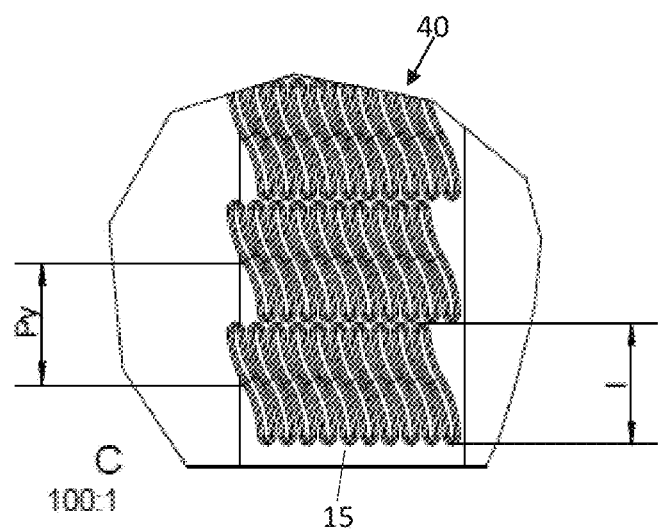
FIG. 6H shows detail C from FIG. 6D.

In FIG. 6H, the surface structures 40 have a length l of 5 μm in one spatial direction y. The surface structures are arranged in parallel one behind the other with a period Py of 5 μm.

Owing to the surface structures 40, the surface of the separator plate 2a, 2b has chemical, electrical and/or mechanical properties that differ from regions of the separator plate 2a, 2b with no surface structures 40. Due to the surface structures 40, for example, an oxygen content of the surface material of the separator plate 2a, 2b may be greater in the region of the periodic surface structures 40 than outside of the periodic surface structures 40.

Figure 9:
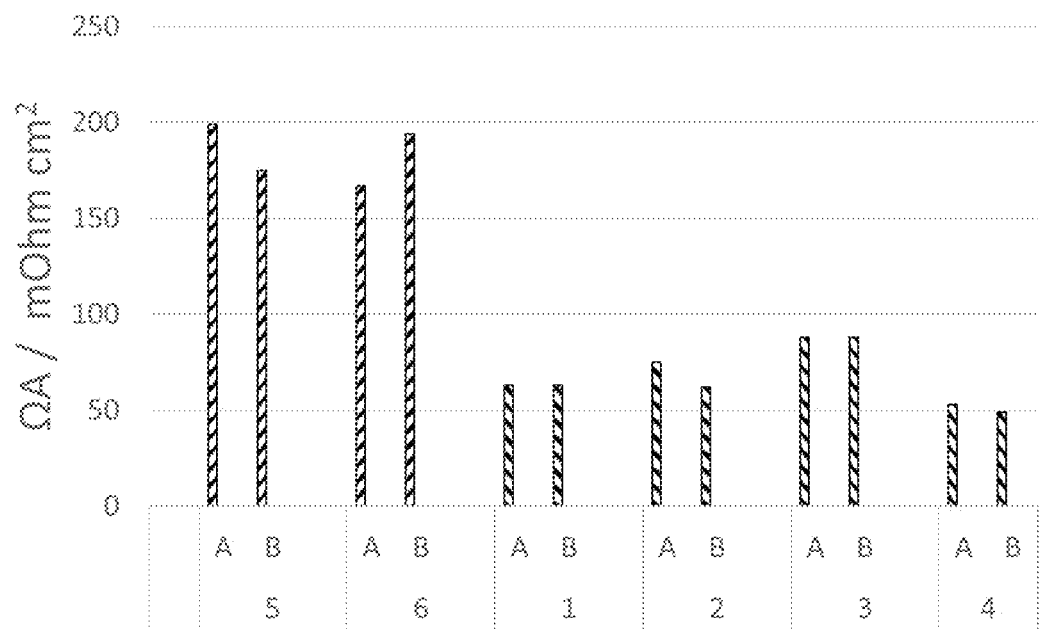
FIG. 9 shows resistance measurements on a stainless-steel sheet.

It has surprisingly been found that, despite the increased oxygen content, the electrical conductivity of the separator plate 2a, 2b in combination with a gas diffusion layer is greater in the region of the surface structures 40 than outside of the surface structures 40. FIG. 9 shows comparative measurements on a composite formed of stainless-steel sheet and a respective gas diffusion layer (GDL) on both sides. The stainless-steel sheet has a thickness of 75 μm, and the gas diffusion layers each have a thickness of approximately 190 μm. The electrical volume resistance was measured in different portions 1-6 of the composite formed of stainless-steel sheet and gas diffusion layer. In portions 1-4, the stainless-steel sheet has the aforementioned surface structures 40 in different variants. In portions 5-6, the steel sheet has no surface structures 40. Two measurements A, B were carried out for each portion. It can be seen from the measurement results shown in FIG. 9 that the volume resistance in the portions 1-4 provided with the surface structures 40 is significantly less than the volume resistance in the portions 5-6 with no surface structures 40. Due to the lower electrical resistance, the portions 1-4 with the surface structures 40 thus have an improved electrical conductivity. It is therefore advantageous if the surface structures 40 are provided in the region of contact with the gas diffusion layer. In other words, the webs 15 of the active region 18 may have the surface structures 40. The different extent of the reduction in the electrical resistance between the surface structures in the present case, which are provided with LSFL structures, and the aforementioned reduction value for LSFL structures can be attributed to different sheet batches and different laser parameters.

The separator plate 2a, 2b may have at least one or more coatings. One such coating may be provided to increase the electrical conductivity and/or corrosion resistance of the separator plate 2a, 2b. The coating may take place across the entire surface. Alternatively, certain regions of the separator plate 2a, 2b are provided with a coating. In some embodiments, at least the regions that are provided with the periodic surface structures 40 are provided with the coating, for example with a coating that increases the electrical conductivity. The coating may be provided only in the region of the webs 15 and thus may be omitted in the region of the channels 16.

The coating may for example contain one or more of the following substances or consist of one or more of said substances or alloys thereof: electrically conductive oxides, carbon, electrically conductive carbon layers, such as graphite, noble metals, such as Au, Ag or Pt, metals such as Ti or Cr, metal nitrides, for example TiN, CrN, Cr2N, metal carbides, metal borides, metal silicides and/or silicon carbide.

A method for producing a separator plate for an electrochemical system will be disclosed below. The method is suitable for producing the separator plate 2a, 2b described above.

Figure 7:
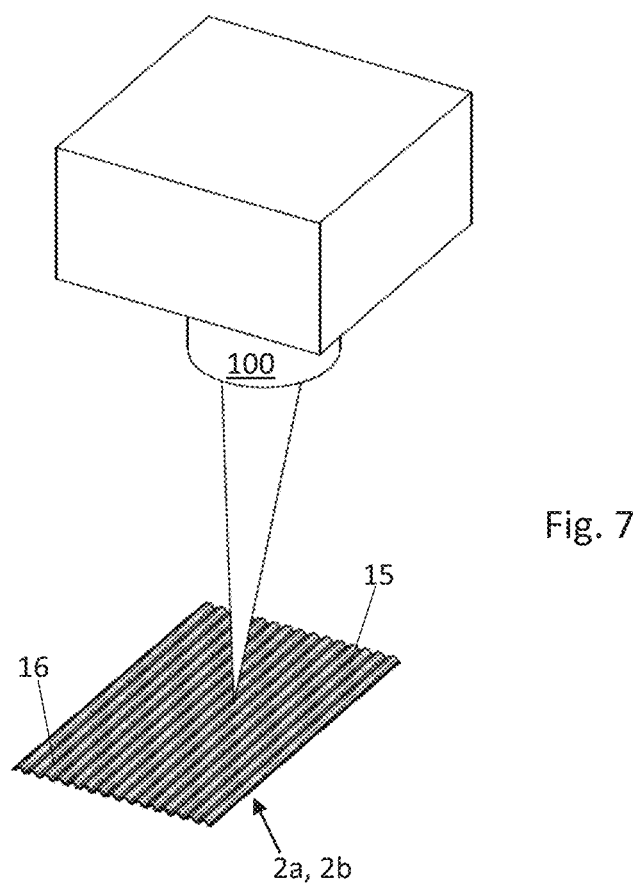
FIG. 7 schematically shows, in a perspective view, a laser system for creating periodic surface structures.
Figure 8A:
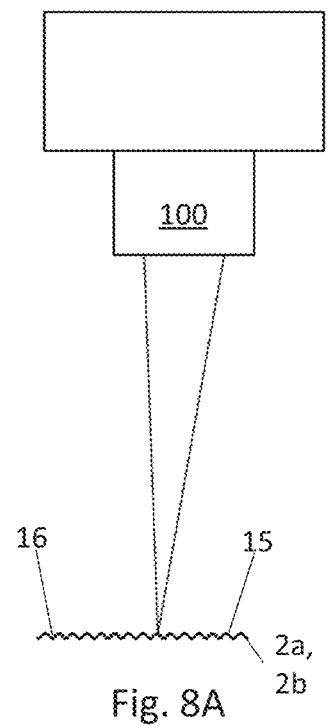
FIG. 8A schematically shows a cross-section of the laser system of FIG. 7.
Figure 8B:
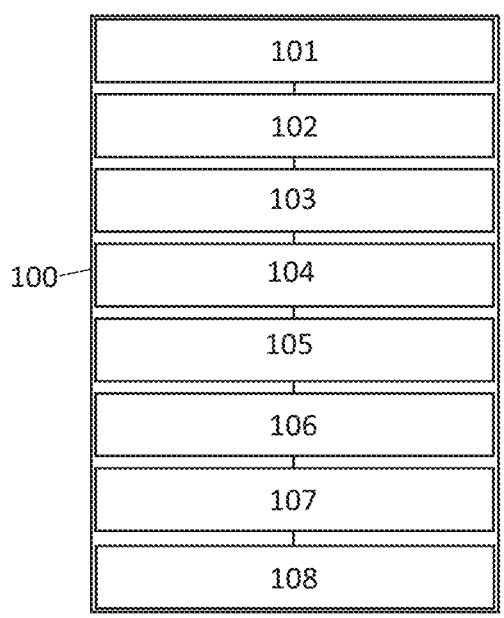
FIG. 8B shows a detail of the laser system of FIGS. 7 and 8A.

The method is characterized by a laser treatment using a laser 100 shown in FIGS. 7 and 8A. Here, a laser treatment is shown on an excerpt from a separator plate 2a or 2b that is already provided with channels 16 and webs 15. The treatment could take place analogously in the region of the rear webs 19 and the coolant channels formed between the latter, that is to say on the coolant side of the respective separator plate 2a or 2b. FIG. 8B shows some example components of the laser 100, namely a laser head 101, a first mirror 102, a second mirror 103, a λ/2 plate 104, a polarizer, for example a linear polarizer 105, a beam splitter 106, a cap 107 and a lens 108. Of course, a different construction of the laser 100 is also possible.

For embodiments of the method, a pulsed laser 100 is used, wherein each pulse has a pulse duration of less than 1 ns, less than 100 ps. The laser 100 may therefore be a picosecond laser (pulse duration shorter than 1 ns and greater than or equal to 1 ps) or a femtosecond laser (pulses shorter than 1 ps, shorter than 500 fs and/or greater than or equal to 30 fs). The laser 100 may generate linearly polarized laser radiation. A beam diameter or a smallest lateral size of the laser parallel to the surface of the separator plate 2a, 2b may be for example at least 20 μm and/or at most 2 mm, in the example shown approximately 60 μm. The wavelength λ, generated by the laser 100 is for example between 200 nm and 2000 nm, or between 400 nm and 1500 nm. Customary wavelengths are for example 700 to 1000 nm corresponding to a Ti:sapphire laser system; 1064 nm (fundamental wavelength) or 532 nm, 355 nm or 266 nm (frequency multiplication) corresponding to an Nd:YAG laser system. A fluence of the laser should be selected as a function of the material of the separator plate 2a, 2b and may be for example at least 0.1 and/or at most 10.0 J/cm2. The repetition rate of the laser may be for example at least 10 Hz, at least 1 kHz and/or at most 1000 kHz, or at most 20 kHz.

Hoehm 2014 includes a detailed description of the interaction of laser radiation with material to create periodic surface structures 40, with advantageous combinations of laser parameters also being published in Hoehm 2014. For this reason, there is no need for a further description here.

The method comprises at least the following steps:
providing a separator plate 2a, 2b,
irradiating the separator plate 2a, 2b by means of the pulsed laser 100,
creating periodic surface structures 40 on the separator plate 2a, 2b by way of the laser radiation.

For example, if only the region of the webs 16 or of the rear webs 19 is being treated, the laser beam may be guided parallel to the web direction or perpendicular to the web direction, or also at an angle differing therefrom. For example, when performing a laser surface treatment on the rear webs 19 of two separator plates 2a, 2b that are to be joined to form a bipolar plate 2, the laser may be guided for example in an identical, opposite or perpendicular manner in each case.

The creation of said plurality of periodic surface structures 40 is already complete before the next laser pulse hits the surface of the separator plate 2a, 2b. For example, at least 10 or at least 20 surface structures, for example trench structures, may be created per laser pulse. The surface structures 40 are typically oriented perpendicular to the linear polarization direction of the incident laser radiation. The laser 100 may thus be directed onto a surface of the separator plate 2a, 2b in such a way that surface structures 40 that have a desired orientation are created. This applies for example to the core regions of the irradiated area. When the laser pulse hits the surface of the separator plate 2a, 2b, the incident laser radiation interferes with an electromagnetic surface wave in the surface material of the separator plate 2a, 2b that is generated by the laser pulse. The periodic surface structures 40 are formed as a result of this interaction.

A mean spatial period Px of the surface structures 40 usually depends on the wavelength λ of the laser 100. For metals (metal sheet, stainless-steel sheet), the period P is approximately in the order of magnitude of the wavelength λ. By way of example, the mean spatial period P of the surface structures 40 is at least 2%, at least 5%, at least 20% and/or at most 200%, or at most 120% of the laser wavelength used.

A single laser beam is in principle sufficient to create the surface structures 40. This laser beam can then scan the surface of the separator plate 2a, 2b that is to be treated. In this case, said plurality of periodic surface structures is created by each individual laser pulse within a spatial projection of the laser radiation onto the separator plate. The method can be accelerated if an interference pattern or diffraction pattern is formed by at least two laser beams and the surface is scanned with the interference pattern to create the surface structures 40. To this end, a linearly polarized laser beam of the laser 100 may be split by way of the beam splitter 106. The two linearly polarized partial beams thereby produced are then used to form the interference pattern. The interference pattern of the laser beams that is used serves only to enlarge the scanned surface area and has no direct influence on the periodicity of adjacent surface structures 40. The spatial period of the surface structures 40 thus differs from the spatial period of the interference pattern or diffraction pattern and is usually significantly smaller, for example 10 times smaller. However, comparative measurements have shown that, by means of this surface structuring applied in an accelerated way, the volume resistance cannot be reduced to the same extent as when using just one single laser beam. As an alternative or in addition, a line-type laser can also be used, with the laser line thereof having a width of at least 20 μm in some embodiments.

In some embodiments, at least the webs 15 and/or the rear webs 19 of the separator plate 2a, 2b are irradiated with the laser 100, as a result of which the surface structures 40 are formed on the webs 15 and/or on the rear webs 19. In this case, the webs 15 and/or rear webs 19 and/or the electrochemically active region 18 of the flow field 17 may be formed either before the laser treatment or after the laser treatment. In other words, the necessary steps of shaping the flat stainless-steel sheet to form the separator plate 2a, 2b, such as deep drawing or stamping, take place before or after the irradiation by means of the laser 100.

A coating may be applied to the separator plate 2a, 2b, for example in order to increase the electrical conductivity of the separator plate 2a, 2b. The coating may have a thickness of at least 10 nm and/or at most 100 µm, or of at least 50 nm and/or at most 50 µm. For possible materials of the coating, reference is made to the materials above. For example, it is advantageous if the coating is applied to the surface structures 40. Depending on the type of coating, different coating processes are conceivable. For instance, the coating may take place by means of PVD, CVD or PA-CVD. Less technically demanding methods for applying the coating to the separator plate 2a, 2b include for example spraying, brush plating, screen printing, roller printing, stencil printing or metering processes. The coating may contain a thermoplastic or thermosetting binder for applying the coating to the separator plate in liquid form. If the coating takes place across the entire surface, the coating may in some sections be removed in a next step. To this end, the laser 100 or alternatively another laser can be used, which is configured to remove material of the coating.

Figure 10:
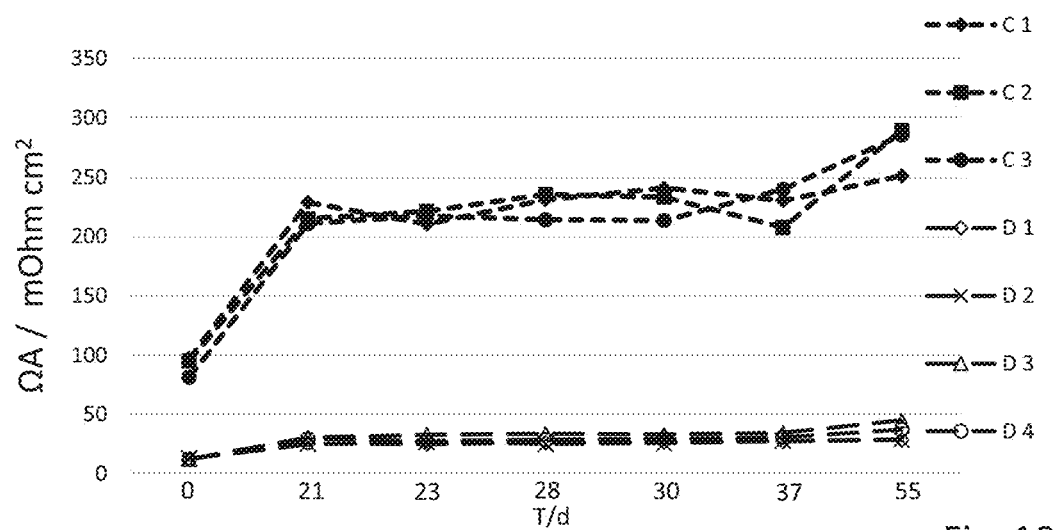
FIG. 10 shows resistance measurements on different specimens.

FIG. 10 shows further comparative measurements on different specimens C1-C3, D1-D4, each specimen comprising a composite formed of two separator plates 2a, 2b with a gas diffusion layer (GDL) applied to both sides. While the separator plates of the specimens D1-D4 have a surface structuring in the form of an LSFL laser surface treatment substantially across the entire surface in the active region on both surfaces, the specimens C1-C3 have not undergone any such surface treatment. Apart from the laser surface treatment, the specimens C1-C3, D1-D4 are identical. The separator plates 2a, 2b and the gas diffusion layers of the specimens C1-C3, D1-D4 have been compressed at 1250 N. In addition, the specimens C1-C3, D1-D4 have been stored at 100° C., and volume resistance measurements have been carried out at various time intervals. In the diagram, T indicates the time in days, while ΩA is a measure of the volume resistance in mOhm cm2. The time T=0 indicates the time of manufacture of the specimens C1-C3, D1-D4 and the start of storage at 100° C. It can be seen that, throughout the entire measurement time, the untreated specimens C1-C3 have a significantly higher volume resistance than the specimens D1-D4 that have been surface-treated by laser, which have the periodic surface structures 40 as a result of the laser surface treatment. A jump in the volume resistance between T=0 and T=21 can also be seen. This jump can be attributed to the temperature-induced growth of a passivation layer, which increases the volume resistance. The values of the volume resistance of the specimens then stabilize, with there being a further moderate increase in the volume resistance in the time T=37 to T=55.

Figure 11:
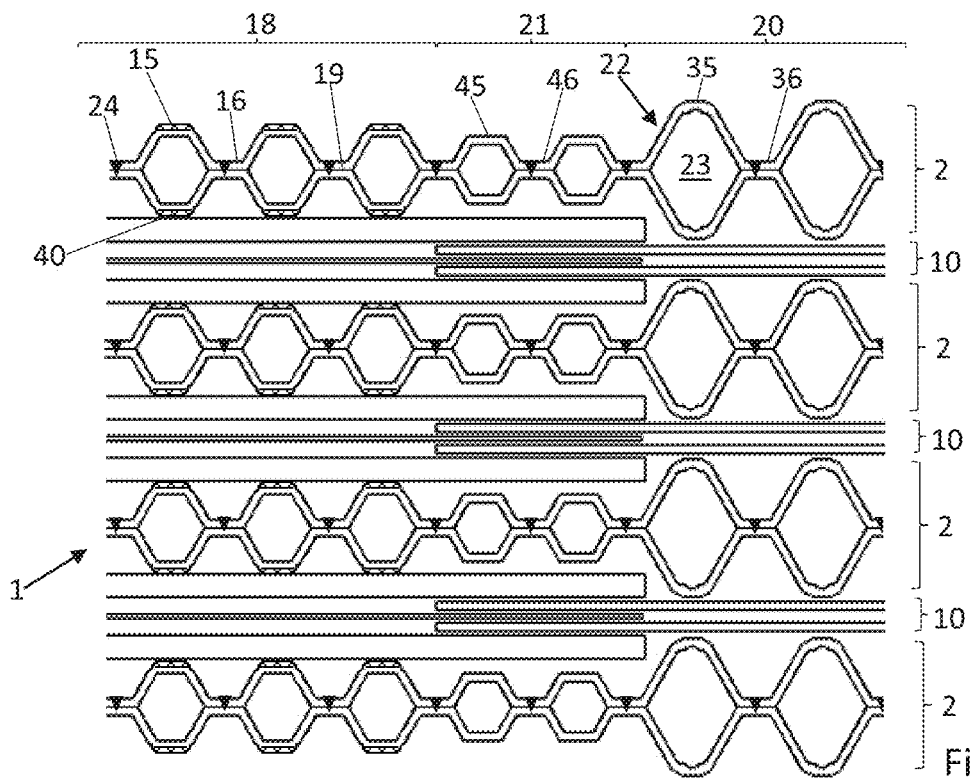
FIG. 11 shows a sectional view through another electrochemical system along a section line A-A shown in FIG. 2.
Figure 12:
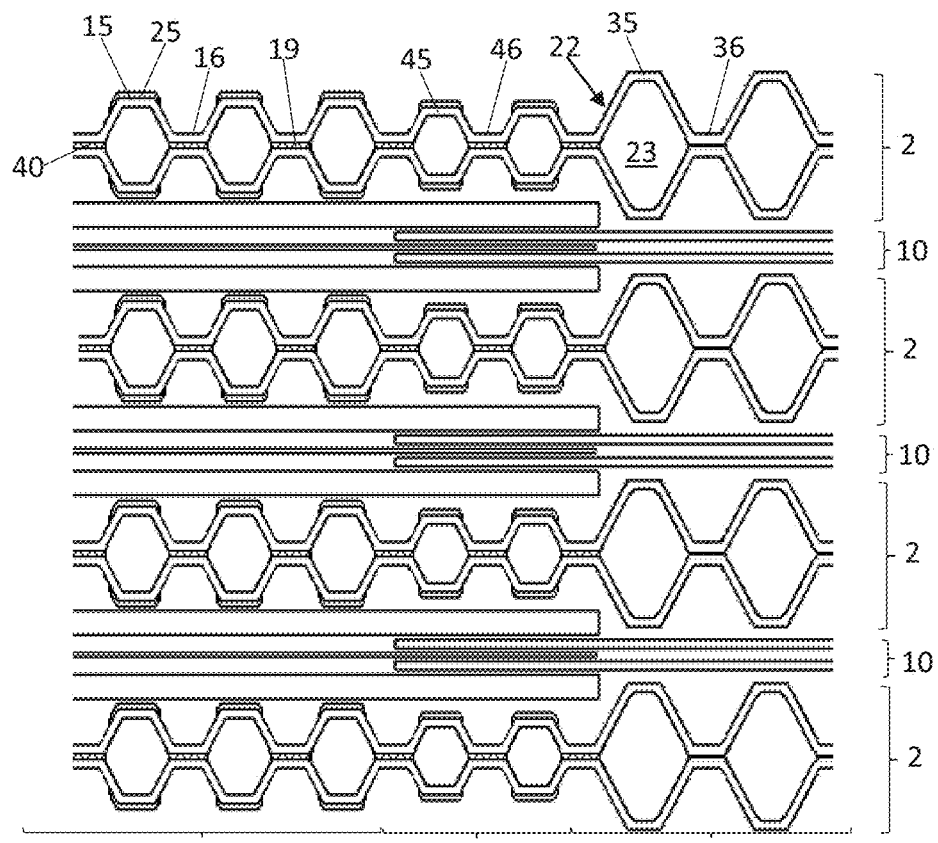
FIG. 12 shows a sectional view through another electrochemical system along a section line A-A shown in FIG. 2.
Figure 13:
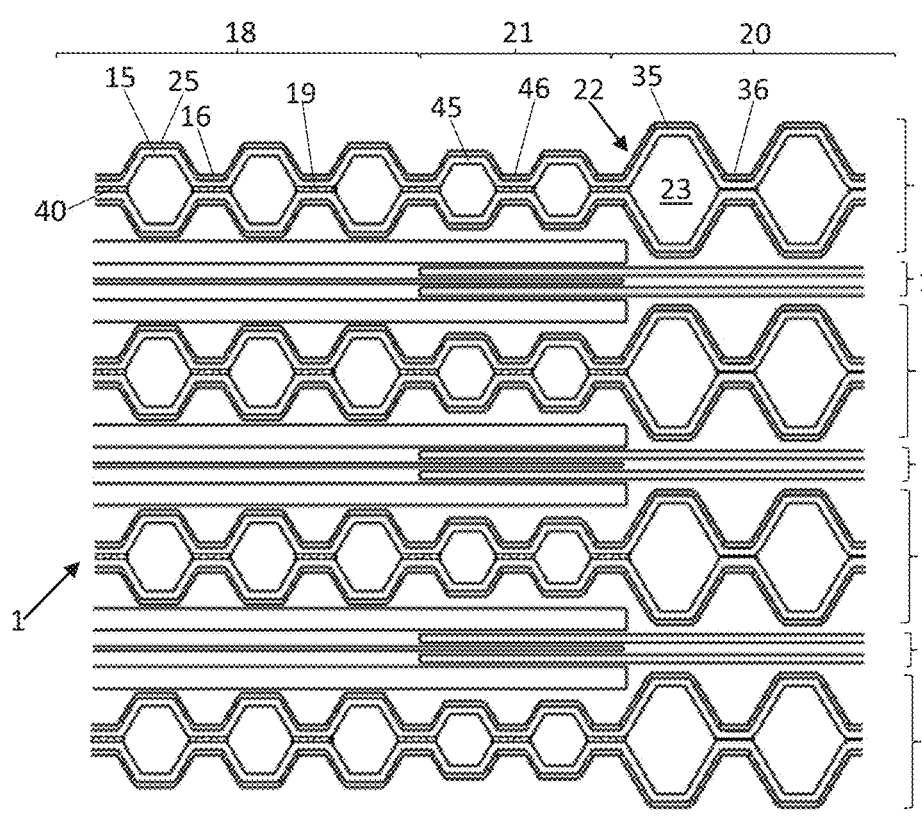
FIG. 13 shows a sectional view through another electrochemical system along a section line A-A shown in FIG. 2.

FIGS. 11-13 each show a sectional view through another electrochemical system along a section line A-A shown in FIG. 2. For the sake of clarity, the same nomenclature and the same reference signs as in FIG. 3 will be used in FIGS. 11-13.

The bipolar plates 2 of the electrochemical systems 1 of FIGS. 11-13 differ in that the periodic surface structures 40 are provided at different places or on different sides of the separator plates 2a, 2b.

For instance, it can be seen in the electrochemical system 1 of FIG. 11 that the periodic surface structures 40 are provided on the outer sides 22 of the bipolar plates and face towards the gas diffusion layers 27. The outer sides 22 can also be referred to as the reactant side or gas side. For example, the periodic surface structures are provided only on the webs 15 in the active region 18. To improve the electrical conductivity and/or reduce the volume resistance, the separator plates 2a, 2b are connected by means of materially bonded connections, such as laser-welded joints 24. The laser-welded joints 24 may be arranged in the electrochemically active region 18 of the flow field 17, for example in the contact zones or contact regions thereof which are formed by the depressions 16. In the x-direction for example (that is to say parallel to the cooling fluid flow direction), the welded joints 24 may form stitch welds, which each comprise a row of linear weld sections, for example spaced apart from one another. The separator plates 2a, 2b contact one another and bear against one another in said contact zones.

The surface structures 40 discussed in this document may lead to a significant reduction in the electrical contact resistance and/or to a significant increase in the electrical conductivity, for example on the contact surfaces of the outer sides 22 of the bipolar plate 2, that is to say on the webs 15. A comparison of FIG. 11 with FIGS. 12, 13 shows that the surface structures 40 can be used instead of a coating 25 to improve the conductivity.

Due to this improvement in the electrical conductivity, if the surface structuring 40 is present on the surfaces where the separator plates 2a, 2b contact one another, that is to say on the rear webs 19, the laser-welded sections 24 in the contact zones on the coolant side of the separator plates 2a, 2b can be omitted. In one embodiment, therefore, the bipolar plate 2 may be free of materially bonded connections, such as laser-welded joints, within the flow field 17 or within the electrochemically active region 18 and in said contact zones of the two separator plates 2a, 2b on the coolant side, where the surface structures 40 are arranged, cf. FIGS. 12 and 13.

In the electrochemical system 1 of FIGS. 12 and 13, the periodic surface structures 40 are provided on the inner side 23 of the bipolar plate 2, wherein the inner side 23 can also be referred to as the coolant side. For example, the surface structures 40 are provided in the contact zones, namely in each case on the rear webs 19, that is to say in the regions where the separator plates 2a, 2b contact one another and bear against one another. The surface structures 40 of the two separator plates 2a, 2b face towards one another and touch one another. In some embodiments, both separator plates 2a, 2b have regions containing the periodic surface structures 40. It may also be provided that only one of the two separator plates 2a, 2b comprises the periodic surface structures. It can be seen in FIGS. 12 and 13 that the periodic surface structures 40 are present only on the inner side 23 and in the contact zones as well as in the active region 18 and in the transition region 21. In contrast, the distribution region 20 has no periodic surface structures, but may have the periodic surface structures 40 in other embodiments.

As already indicated above, the bipolar plates 2 of FIGS. 12 and 13 have on the inner side 23 no materially bonded connections, such as welded joints, for connecting and electrically contacting the separator plates 2a, 2b where the periodic surface structures 40 are arranged.

It can also be seen in FIGS. 12 and 13 that the separator plates 2a, 2b of the bipolar plate 2 have on their outer sides 22 a coating 25 to increase the electrical conductivity and/or to improve the corrosion resistance of the respective separator plate 2a, 2b. In the embodiment of FIG. 12, the coating 25 is provided only on the webs 15, 45, for example the rear webs 19 thereof, and thus is omitted in the region of the channels 16, 46. Alternatively, the coating 25 may also be provided in the region of the channels 16, 46 or even across the entire surface on the separator plates 2a, 2b of the bipolar plate 2, cf. FIG. 13. The coating 25 may optionally be combined with the periodic surface structures 40 and may thus be applied to the periodic surface structures 40.

The periodic surface structures 40 may in each case be configured differently on the inner side 23 and outer side 22 by using different laser parameters. Likewise, regions of different surface structures 40 may be present on one side 22, 23, due to different laser parameters.

Further comparative measurements have been carried out to demonstrate the effect that the position of the periodic surface structures 40 on the bipolar plate 2 has on the volume resistance.

For two compressed separator plates 2a, 2b with no surface treatment and with no welded joints in the contact region of the separator plates, a volume resistance of 161 mOhm cm2 was measured.

For two compressed separator plates 2a, 2b with no surface treatment and with welded joints 24 in the form of stitch welds in the contact region of the separator plates 2a, 2b, a volume resistance of 121 mOhm cm2 was measured, cf. the separator plates 2a, 2b of FIG. 3.

For two compressed separator plates 2a, 2b with surface treatment in the form of periodic surface structures 40 on the outer side 22 and with welded joints 24 in the form of stitch welds in the contact region of the separator plates, a volume resistance of 5.3 mOhm cm2 was measured, cf. the separator plates 2a, 2b of FIG. 11.

For two compressed separator plates 2a, 2b with surface treatment in the form of periodic surface structures 40 both on the outer side 22 and on the inner side 23 and with no welded joints in the contact region of the separator plates 2a, 2b, a volume resistance of 4.8 mOhm cm2 was measured, cf. the separator plates 2a, 2b of FIGS. 12, 13 with additional surface structures 40 on the outer side 22.

Based on a geometrically different separator plate type and with separator plates manufactured from a different stainless-steel batch, the following volume resistances were measured under comparable conditions for pairs of separator plates compressed together with gas diffusion layers: 6.1 mOhm cm2 for a separator plate pair provided with an LSFL surface structuring across the entire surface on both surfaces of the active region, compared to 6.6 mOhm cm2 for a separator plate pair connected by stitch welds and provided with an LSFL surface structuring across the entire surface only on the outer surface of the active region. For a separator plate pair with no laser surface structuring and with no stitch welds, a volume resistance of 74 mOhm cm2 is measured under otherwise identical conditions.

It can be deduced from this that the effect of the surface treatment on the inner side leads to similar, in some cases even better, resistance values than the stitch welds 24.

It should be noted that the separator plates 2a, 2b and bipolar plates 2 shown in FIGS. 11-13 can also be claimed in isolation, that is to say without the other features of the electrochemical system 1. However, features of FIGS. 11-13 can also be combined, such as the surface structuring 40 on the gas side of the separator plates 2a, 2b of FIG. 11 with the surface structuring 40 on the coolant side of the separator plates 2a, 2b, as shown in FIGS. 12 and 13. The stitch welds 24 can be omitted in this case.

FIGS. 1-8B and 11-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" or "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE SIGNS 1 electrochemical system
2 bipolar plate
2a separator plate
2b separator plate
3 end plate
4 end plate 5 media port
7 z-direction
8 x-direction
9 y-direction
10 membrane electrode assembly (MEA)
11a through-opening
11b through-opening
11c through-opening
15 webs
16 channels
17 flow field
18 active region
19 rear webs
20 distribution or collection region
21 transition region
22 outer side of the bipolar plate
23 inner side of the bipolar plate
24 laser-welded joints
25 coating
26 membrane electrode
27 gas diffusion layer
28 reinforcing layer
29 membrane composite
30 reinforced region
35 webs of the distribution or collection region
36 channels of the distribution or collection region
40 surface structures
42 depression
44 elevation
45 webs of the transition region
46 channels of the transition region
100 laser system
101 laser head
102 first mirror
103 second mirror
104 V2 plate
105 polarizer
106 beam splitter
107 cap
108 lens
b width
t depth
l length
Px period in x-direction
Py period in y-direction

The invention claimed is:

1. A separator plate for an electrochemical system, the separator plate comprising:
a plurality of webs and channels formed between the webs; and
at least in some regions, surface structures arranged periodically with a mean spatial period of less than 10 µm, and the surface structures arranged on at least some sections of the webs and/or the surface structures arranged on at least some sections of rear webs, the rear webs formed on the surface of the separator plate opposite the channels.

2. The separator plate according to claim 1, wherein the surface structures comprise depressions which extend substantially parallel to one another.

3. The separator plate according to claim 2, wherein the depressions have:
a depth of at least 8 nm and/or at most 0.5 µm; and/or
a width of at least 0.1 µm and/or at most 2 µm; and/or
a period in one spatial direction of at least 0.3 µm and/or at most 3 µm.

4. The separator plate according to claim 1, wherein the separator plate is surface-treated by laser in the region of the surface structures.

5. The separator plate according to claim 1, wherein the surface structures are arranged periodically with respect to one another at least in one spatial direction.

6. The separator plate according to claim 1, wherein an oxygen content of a material of a surface of the separator plate is greater in the region of the surface structures than outside of the region of the surface structures.

7. The separator plate according to claim 1, wherein at least the regions provided with the surface structures are provided with a coating at least in some sections and the coating increases the electrical conductivity.

8. The separator plate according to claim 7, wherein the coating comprises one or more of the following substances or alloys thereof: electrically conductive oxides, carbon, electrically conductive carbon layers, noble metals, metals, metal nitrides, metal carbides, metal borides, metal silicides, and/or silicon carbide.

9. A bipolar plate comprising two separator plates according to claim 1, wherein the webs form a contact surface for bearing against a diffusion layer, and/or the rear webs form a contact surface for bearing against one another.

10. The bipolar plate according to claim 9, wherein an electrical resistance in the region of the contact surface between the webs and the gas diffusion layer and/or between the rear webs of the two separator plates is reduced by the surface structures.

11. The separator plate according to claim 1, wherein the surface structures reduce an electrical contact resistance of the separator plate.

12. The separator plate according to claim 1, wherein the separator plate does not have material bonds or welds within an electrochemically active region of the separator plate and the surface structures are arranged at a contact surface between the rear webs and another layer or plate of the electrochemical system.

* * * * *